United States Patent
Cote et al.

(10) Patent No.: US 11,726,802 B2
(45) Date of Patent: Aug. 15, 2023

(54) ROBUST USER INTERFACE RELATED ROBOTIC PROCESS AUTOMATION

(71) Applicant: SERVICENOW CANADA INC., Montreal (CA)

(72) Inventors: Marie-Claude Cote, Montreal (CA); Alexei Nordell-Markovits, Montreal (CA); Andrej Todosic, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 0 days.

(21) Appl. No.: 17/279,989

(22) PCT Filed: Sep. 26, 2019

(86) PCT No.: PCT/CA2019/051376
§ 371 (c)(1),
(2) Date: Mar. 25, 2021

(87) PCT Pub. No.: WO2020/061700
PCT Pub. Date: Apr. 2, 2020

(65) Prior Publication Data
US 2021/0397157 A1 Dec. 23, 2021

Related U.S. Application Data

(60) Provisional application No. 62/738,319, filed on Sep. 28, 2018.

(51) Int. Cl.
*G06F 9/451* (2018.01)
*G06N 20/00* (2019.01)
*G06F 40/10* (2020.01)
*G06V 30/412* (2022.01)
*G06V 30/10* (2022.01)
(Continued)

(52) U.S. Cl.
CPC .......... *G06F 9/451* (2018.02); *G06F 3/04886* (2013.01); *G06F 40/10* (2020.01); *G06N 20/00* (2019.01); *G05B 2219/32128* (2013.01); *G06F 40/205* (2020.01); *G06V 30/10* (2022.01); *G06V 30/412* (2022.01)

(58) Field of Classification Search
CPC ...... G06F 9/451; G06F 40/10; G06F 3/04886; G06F 40/205; G06N 20/00; G05B 2219/32128; G06V 30/412; G06V 30/10; G06V 2201/02
See application file for complete search history.

(56) References Cited

U.S. PATENT DOCUMENTS

| | | | |
|---|---|---|---|
| 2016/0019197 A1* | 1/2016 | Iasi | G06F 40/174 715/224 |
| 2017/0199857 A1* | 7/2017 | Greiner | G06F 40/174 |
| 2017/0228119 A1 | 8/2017 | Hosbettu et al. | |

(Continued)

*Primary Examiner* — Daniel Samwel
(74) *Attorney, Agent, or Firm* — Fasken Martineau Dumoulin LLP

(57) ABSTRACT

Systems and methods relating to enhancing capabilities of robotic process automation systems. A system and method includes recognizing and analyzing the components of a user interface on which at least one task is to be executed. The task can be executed regardless of changes to the user interface as the components of the task are based on the presence and function of areas of the user interface and not on the location of the components necessary to execute the task.

10 Claims, 1 Drawing Sheet

(51) Int. Cl.
*G06F 40/205* (2020.01)
*G06F 3/04886* (2022.01)

(56) References Cited

U.S. PATENT DOCUMENTS

2018/0095651 A1\* 4/2018 Manske .............. G06F 3/04842
2018/0203674 A1   7/2018 Dayanandan et al.
2019/0018675 A1\* 1/2019 Ang ..................... G06F 16/903
2019/0294641 A1\* 9/2019 Alexeev ................ G06F 16/951
2019/0324781 A1\* 10/2019 Ramamurthy ...... G06F 9/45512

\* cited by examiner

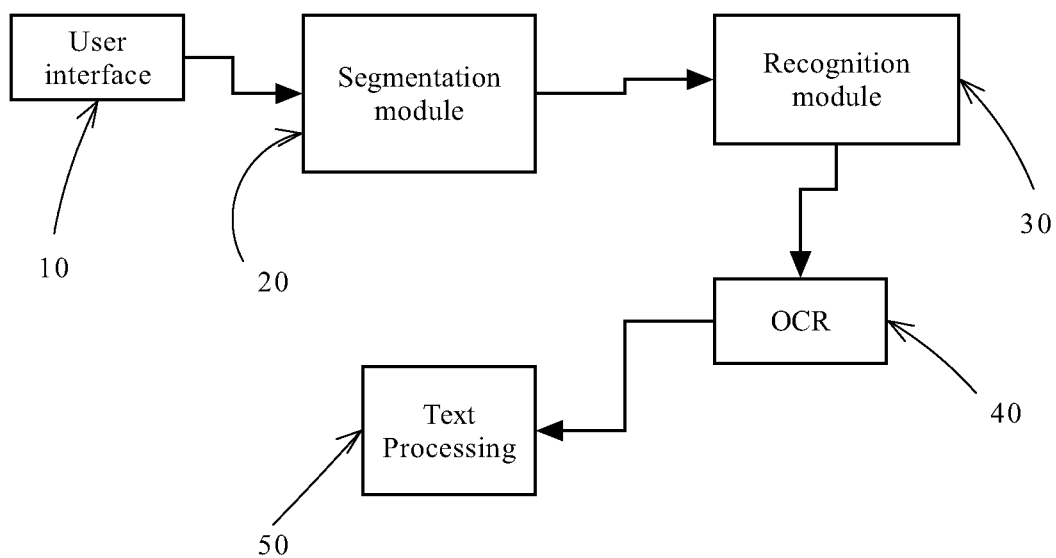

ROBUST USER INTERFACE RELATED ROBOTIC PROCESS AUTOMATION

CROSS REFERENCE TO RELATED APPLICATIONS

The present application is a U.S National Phase Application pursuant to 35 U.S.C § 371 of International Application No. PCT/CA2019/051376 filed Sep. 26, 2019, which claims priority to U.S. Provisional Patent Application No. 62/738,319 filed Sep. 28, 2018. The entire disclosure contents of these applications are herewith incorporated by reference into the present application.

TECHNICAL FIELD

The present invention relates to robotic process automation (RPA) systems that perform repetitive tasks based on a programmed set of instructions. More specifically, the present invention relates to the use of machine learning as applied to such automation systems to enhance the capabilities of such systems.

BACKGROUND

The rise of automation since the late 20th century is well documented. The application of such automated systems in manufacturing is well-known. These automated systems that perform pre-programmed, repetitive tasks are now being used not just in manufacturing but in other areas of industry and human activity. These have been used in scientific laboratories to carry out repetitive tasks that may be prone to error when executed by humans. They are now also beginning to be used in industries where they can provide error free execution of mundane, repetitive tasks. One major development in the past few years has been the rise of RPA (Robotic Process Automation). Instead of having a physical robot perform repetitive physical tasks, a robotic agent is used to perform repetitive virtual tasks on a graphical user interface. As an example, copying data from one form into another form and then saving the result is a task that RPA agents are well-suited to perform. Not only are the agents fast, they are also accurate.

While robots are useful and while they excel in performing such repetitive tasks, they are not very robust or resilient. They are able to execute tasks only for circumstances that they are specifically programmed for. As such, deviations from their pre-programmed circumstances and context will cause these systems to fail at their tasks. As an example, in manufacturing, each component has to be at a very specific location from which a robot can locate and retrieve that component. If a component is located at a slightly different location, the robot may be unable to retrieve the component and may generate an error or system failure.

In tasks that involve the manipulation of data and/or the retrieval and/or placement of data, robots or robotic agents suffer from the same issues. If a robotic agent is programmed to retrieve specific data from a user interface and then to place that data in another user interface, those two user interfaces must be exactly as the robotic agent expects them to be. Any changes or deviations from the expected user interface may result in errors or in the failure of the robotic agent in executing the task. As an example, if the robotic agent is expecting a radio button at a specific spot in the user interface, that radio button cannot be moved to another spot as the robotic agent will not know how to handle this change. Resilience and robustness are therefore two main shortcomings of robots. Any small deviations from what they expect when executing their preprogrammed tasks will, invariably, produce errors.

In addition to the above, current automated systems are only as good as the programs or software that operate on them. These systems are, for lack of a better term, "unintelligent". If programmed to process data, these systems blindly process the data, even if there are issues with the data. These systems are thus incorrigibly deterministic. Any errors encountered in the data are happily ignored unless the system is specifically programmed to find such errors.

There is therefore a need for systems and methods that allow such automated systems to be more robust and to be more flexible and resilient when encountering errors in the data being processed. Preferably, such systems and methods are such that they do not require painstakingly programming not only each and every possibility to be encountered but also what contingencies to follow for each one of these possibilities.

SUMMARY

The present invention provides systems and methods relating to enhancing capabilities of robotic process automation systems. A system and method includes recognizing and analyzing the components of a user interface on which at least one task is to be executed. The task can be executed regardless of changes to the user interface as the components of the task are based on the presence and function of areas of the user interface and not on the location of the components necessary to execute the task.

In a first aspect, the present invention provides a method for performing at least one task involving at least one interaction with a user interface, the method comprising:
 a) receiving said user interface;
 b) analyzing said user interface using machine learning to determine different areas of said user interface;
 c) analyzing said user interface using machine learning to determine data associated with each of said areas determined in step b);
 d) determining, using machine learning, which areas in said user interface contain data relevant to said at least one task;
 e) executing said at least one task by executing at least one interaction with either:
  at least one of said areas determined in step d); or
  data contained in said at least one of said areas.

In a second aspect, the present invention provides a system for determining components of a user interface, the system comprising:
 an area determination module for determining different areas in said user interface;
 a recognition module for determining a function for at least one of said different areas in said user interface;
 a data processing module for determining data associated with at least one of said different areas in said user interface;
 wherein
 said recognition module receives an output of said area determination module to thereby assign functions to said at least one area in said user interface;
 said data processing module receives an output of said recognition module to thereby assign data to be associated with said at least one area in said user interface.

BRIEF DESCRIPTION OF THE DRAWINGS

The embodiments of the present invention will now be described by reference to the following figures, in which identical reference numerals in different figures indicate identical elements and in which:

FIG. 1 is a block diagram of a system according to one aspect of the present invention.

DETAILED DESCRIPTION

The present invention relates to the use and provision of machine learning and artificial intelligence methods and systems for use in RPA and in RPA executed tasks. As noted above, automated systems have been used in many fields. These systems are generally used to perform multiple preprogrammed repetitive tasks. Machine learning and systems relating to machine learning can provide such automated systems with the capability to adjust to changing conditions and circumstances, thereby providing robustness, resilience, and adaptability to these systems.

In one aspect of the present invention, robustness is provided to RPA by allowing automated systems to be adaptable to changing user interfaces. In some implementations of RPA, robots (or automated systems) are used to interact with user interfaces to execute different preprogrammed (and repetitive) tasks. As an example, robots can be preprogrammed to access a user interface on a system, enter specific data into specific fields, and then save the result. Normally, this task would be performed by a human user. If performed by a human user, changes in the user interface (such as changing the location of specific fields that are to be interacted with by a user) would be addressed by the human by recognizing the changed layout of the user interface. Such changes would be dealt with by a human user by recognizing the different location of fields and/or buttons in the user interface. Accordingly, such a human user would enter the requisite data into the relevant fields and then the relevant buttons would be clicked.

A machine learning enhanced automated system can address user interface layout changes by determining the different fields in the user interface, determining which fields are to be interacted with (e.g. radio buttons, fields for data entry, clickable buttons, etc.), and then performing an optical character recognition (OCR) or entity extraction process to recognize the data (i.e. text and/or images) associated with each of these fields. Then, using the data recognized using OCR or by the entity extraction process, the system can then determine which of the fields are relevant to the task to be performed. As an example, if the task involves clicking or activating a button labelled "SAVE", then the button is recognized when determining the fields present in the user interface and when determining which fields can be interacted with. In addition, the OCR process would recognize/match the text "SAVE" associated with the button field in the user interface. Using such a process (or a version thereof), the automated process can thus determine where the button makes "SAVE" is located and that this button can be interacted with.

A machine learning enabled system such as that illustrated in FIG. 1 may be used to implement the above functionality. In this example, a user interface 10 that the robotic agent is to interact with is first received by a segmentation module 20. The segmentation module 20 segments the user interface 10 into various areas and/or regions. The result is then passed on to a recognition module 30. The recognition module 30 recognizes each area/region to determine which ones can be interacted with or are activatable (i.e. which areas define buttons, which areas define data fields for data input, etc.). The user interface is then processed by an extraction module 40 to recognize the text/images in the interface. A text processing module 50 then takes the output of the extraction module and associates the various recognized instances of text with the areas that can be interacted with or are activatable. Once the text/data has been associated with the areas for activation and/or interaction, then the actions or interactions programmed for the robotic agent can be executed (60). It should be clear that the extraction module 40 can perform OCR or any other process that extracts entities from the user interface including images, text, and other entities that may be present in the user interface.

Using the above system and/or method, the robotic agent does not need to exactly follow the steps outlined by a human when programming the execution of a task. Instead, the steps are abstracted and the interactions are driven not by the specific placement of indicia in a user interface (e.g. the button at location x,y on the user interface has to be activated) but rather by the circumstances surrounding each indicia (e.g. a button marked "SAVE" is to be activated). It should be clear that the process can be taken one step further by simply processing the output of the system in FIG. 1 to determine which areas are relevant to the task to be performed. Thus, if the task simply involves clicking a button marked "SAVE", then a button marked "UNDO" on the same interface would be irrelevant and can be ignored for the task to be performed. Thus, by marking or noting only the areas to be interacted with for the task, the rest of the user interface can be ignored by the robotic agent. In addition, the above system and/or method can be engineered to understand the context of the task and of the user interface so that even large interface changes can be handled. Thus, instead of just understanding that a button has to be activated after entering a name, the system can be operated and designed to understand that a new customer profile is being created and, as such, data is necessary for the profile and that the work product will need to be saved after data entry. Accordingly, instead of just searching for a "SAVE" button, the system can search for a button whose function is similar to the function of a "SAVE" button.

Regarding execution of the method and use of the system may not be necessary every time the task to be performed is to be completed. Perhaps the robotic agent can be programmed to execute the method and use the system periodically (e.g. every x times the task is to be performed) to ensure that the user interface has not changed. Note that any change in the user interface would be dealt with by the system as system is user interface agnostic—as long as the user interface contains the elements necessary for the task to be performed, the system can recognize these elements. With the elements recognized, the task can therefore be performed.

It should also be clear that the various modules in the system may involve machine learning. As an example, the segmentation module, the recognition module, the extraction module, and the text processing module may, at some level, use machine learning. In some implementations, suitably trained neural networks may be used to segment the user interface and to recognize which areas can be interacted with. As well, the extraction module may have some neural network instances to assist in recognizing text or characters or even icons. Finally, the text processing module can use another trained neural network to associate specific indicia (recognized by the extraction module or the recognition module) with areas or fields determined by the recognition module.

It should also be clear that, while the figure and the explanation above details multiple instances of neural networks and different instances of machine learning, other implementations may use only one or two such modules with each module performing the functions of multiple modules detailed above. The reader should also note that the various modules illustrated in FIG. 1 may be combined into any number of configurations with different modules performing similar functions or similar but related functions to those listed above. Thus, a module may be implemented to detect the various buttons and/or fields in the user interface without the need for segmenting the user interface. As well, another module may determine the content of text and/or data associated with the various fields and/or buttons without performing an OCR or recognition function as noted above. As long as the process and/or the system used determines the various areas of the user interface, determines the content associated with at least one of the areas of the user interface, and uses that data to perform the task assigned to an RPA agent, the process and/or system is considered to be part of the present invention. It should also be clear that the task may involve at least one interaction with one or more areas in the user interface such as the copying and/or pasting of data to and/or from the user interface, the insertion of data into one of the fields of the user interface, and/or the activation and/or clicking of an activatable area in the user interface (e.g. a button on the user interface), and/or the selection of data in the user interface (e.g. text, image, icons, colors, associated data files).

It should be clear that the various aspects of the present invention may be implemented as software modules in an overall software system. As such, the present invention may thus take the form of computer executable instructions that, when executed, implements various software modules with predefined functions.

It should be noted that the various aspects of the present invention as well as all details in this document may be implemented to address issues encountered in all manners of business related dealings as well as all manners of business issues. Accordingly, the details in this document may be used in the furtherance of any aims, desires, or values of any department in any enterprise including any end result that is advantageous for the fields of accounting, marketing, manufacturing, management, and/or human resource management as well as any expression, field, or interpretation of human activity that may be considered to be business related.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a data processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for performing at least one task involving at least one interaction with a user interface, the method being executed by a processor, the method comprising:
   a) receiving said user interface;
   b) segmenting said user interface using a segmentation neural network to determine different areas of said user interface;
   c) analyzing said user interface using a recognition neural network to determine data associated with each of said different areas;
   d) determining which of the data associated with each of said different areas is relevant to said at least one task independently from a respective location of each of said different areas;
   e) determining, using a text processing neural network, which areas in said user interface contain the data relevant to said at least one task by associating the relevant data with corresponding relevant areas independently from the respective location of each of said relevant areas, said determining comprising ignoring interface areas irrelevant to said at least one task;
   f) executing said at least one task by executing at least one interaction with either:

at least one of said relevant areas determined in step e); or relevant data contained in said at least one of said relevant areas.

2. A method according to claim 1, wherein b) further comprises determining which areas of said user interface can be activated.

3. A method according to claim 1, further comprising a step of determining which areas of said user interface comprises at least one field into which data is to be entered.

4. A method according to claim 1, wherein said at least one task includes at least one of:
- copying data into a data entry field in said user interface;
- activating at least one button on said user interface;
- copying data from at least one area in said user interface; and
- selecting data from at least one area in said user interface.

5. The method according to claim 1, wherein d) is performed independently of a location of said areas.

6. A system for determining components of a user interface, the system comprising:
- a processor; and
- a non-transitory storage medium operatively connected to the processor, the non-transitory storage medium storing computer-readable instructions,
- the processor, upon executing the computer-readable instructions, being configured for:
  - determining, using a segmentation neural network, different areas in said user interface;
  - determining, using a recognition neural network, a function for at least one of said different areas in said user interface;
  - determining, using a text processing neural network, data associated with at least one of said different areas in said user interface; and
  - determining which of the data associated with each of said different areas is relevant to said at least one task independently from a respective location of each of said different areas;

wherein
- said recognition neural network receives an output of said segmentation neural network-to thereby assign functions to said at least one area in said user interface; and
- said text processing neural network receives an output of said recognition neural network to thereby assign data to be associated with said at least one area in said user interface independently from a respective location of said at least one area.

7. The system according to claim 6, wherein said text processing neural network is configured to recognize text data in said user interface.

8. The system according to claim 6, wherein said text processing neural network is configured to assign text data recognized by said text processing neural network to said at least one area in said user interface.

9. The system according to claim 6, wherein an output of said system is used to execute at least one task on said user interface, said at least one task involving at least one interaction with either:
- at least one of said areas in said user interface; or
- with data contained in said at least one of said areas.

10. The method according to claim 5, further comprising, prior to d):
- determining a context of the task and a context of the user interface; and wherein
- d) is based on said determined context of the task and said determined context of the user interface.

* * * * *